United States Patent
Mankoff (12)

(10) Patent No.: US 6,385,591 B1
(45) Date of Patent: May 7, 2002

(54) METHOD AND SYSTEM FOR ELECTRONIC ORGANIZATION OF COUPONS

(76) Inventor: Jeffrey W. Mankoff, 5330 Pebblebrook, Dallas, TX (US) 75229

( * ) Notice: Subject to any disclaimer, the term of this patent is extended or adjusted under 35 U.S.C. 154(b) by 0 days.

(21) Appl. No.: 09/309,989

(22) Filed: May 11, 1999

(51) Int. Cl.[7] .............................................. G06F 17/60
(52) U.S. Cl. .............................. 705/14; 705/16; 705/26
(58) Field of Search ............................... 705/1, 14, 16, 705/26; G06F 17/60

(56) References Cited

U.S. PATENT DOCUMENTS

| | | | | |
|---|---|---|---|---|
| 4,097,067 A | * | 6/1978 | Schechter .................... | 283/56 |
| 4,450,994 A | * | 5/1984 | Holland | |
| 4,882,675 A | * | 11/1989 | Nichtberger et al. .......... | 705/14 |
| 5,127,674 A | * | 7/1992 | Lamphere et al. | |
| 5,305,197 A | * | 4/1994 | Axler et al. ................... | 705/14 |
| 5,305,935 A | * | 4/1994 | Weiner | |
| 5,734,823 A | * | 3/1998 | Saigh et al. ................. | 709/229 |
| 5,806,044 A | * | 9/1998 | Powell ......................... | 705/14 |
| 5,821,513 A | * | 10/1998 | O'Hagan et al. ............ | 235/383 |
| 5,948,061 A | * | 9/1999 | Merriman et al. ............ | 705/14 |

(List continued on next page.)

FOREIGN PATENT DOCUMENTS

| | | | | |
|---|---|---|---|---|
| EP | 09114430 | * | 11/1991 | ............. B41J/3/00 |
| JP | 407327094 A | * | 12/1995 | ........... G06F/17/60 |
| WO | WO9819229 A1 | * | 5/1998 | ........... G06F/17/60 |

OTHER PUBLICATIONS

Sync (catalog), pp.2–3, Advertisement Titled "Now You Can Beat The Contestants on TV's Most Popular Game Show", 1988.*

Article titled "In this Computer Age, Who Needs Coupons?" from the New York Times, Jun. 15, 1989.*

Article titled "Cruising for food savings on Internet" from San Diego Union Tribune, p.C1, Apr. 20, 1996.*

Article titled: "Click Here for Courpons", Laurie Peterson, Direct, p.45, Jun. 1, 1996.*

Article titled: "USA: Sled Internet directory distributes electronic coupons" from PR Newswire, May 1984.*

Sherman, Electronic coupon program offers database potential, from Marketing News, pp. 1–3, Sep. 1995.*

Article tiitled: "SuperMarkets Online: Internet coupon security breakthrough removes major obstacle to online packaged goods advertising", Aug. 5, 1997.*

*Primary Examiner*—Cuong H. Nguyen
(74) *Attorney, Agent, or Firm*—Brian C. McCormack; Baker & McKenzie

(57) ABSTRACT

An electronic or "virtual" coupon is obtained when a user selects a given link in a Web page being displayed on a client machine. Preferably, the link is an image link embedded in an advertising banner that is displayed on the Web page such that user click-through on the banner automatically generates the virtual coupon. The virtual coupon is then saved to a file on the client machine. Thereafter, the virtual coupon is downloaded to a PDA via a communication link when the PDA is synchronized to the desktop. When the virtual coupon is downloaded to the PDA, it is automatically saved in a coupon file. In addition, contact information associated with the coupon provider (e.g., address and e-mail information) is automatically written to the PDA contact file. Moreover, the coupon's expiration date is stored in PDA's calendar, together with information for generating one or more redemption remainders that are periodically issued to the PDA user when the device is powered on. When the user desires to redeem the coupon, he or she may take the PDA to a terminal located at a retail establishment. By synchronizing the PDA to the terminal, the virtual coupon is redeemed in exchange for a discount on a given product or service.

19 Claims, 2 Drawing Sheets

U.S. PATENT DOCUMENTS 5,970,469 A * 10/1999 Scroggie et al. ............... 705/14
5,992,888 A * 11/1999 North et al. .................... 705/14
5,999,914 A * 12/1999 Blinn et al. .................... 705/14
6,009,410 A * 12/1999 LeMole et al. ................ 705/14
6,036,269 A *  2/2000 Capek .......................... 705/14

* cited by examiner

METHOD AND SYSTEM FOR ELECTRONIC ORGANIZATION OF COUPONS

BACKGROUND OF THE INVENTION

1. Technical Field

The present invention relates generally to product and service merchandising through distribution of electronic coupons, gift certificates and the like.

2. Description of the Related Art

Recently, the computer industry has sought to add computer processing and communications capabilities to devices other than what would normally be considered a traditional computer. Such devices include, for example, personal digital assistants (PDAs), business organizers, watches, PCMCIA-based credit card organizers, and other handheld or "palm" devices. These devices typically include technology and software (e.g., 3Com HotSync®) to enable the user to synchronize data between the device and desktop software or another personal information manager (PIM) such as Microsoft Outlook. To synchronize data, the PDA is connected to a desktop either directly (e.g., by placing the PDA in a cradle that is connected to the desktop) or indirectly via an infrared link, a modem or a network. Once the connection is established, information or data located in the desktop computer may be communicated and stored in the PDA.

It is known in the art to display product or service coupons on pages that are available through the Internet's World Wide Web information retrieval system. A user of a computer may access those pages through use of a conventional Web browser. The user navigates to a given page, which is then saved to a file or printed. The hard copy of the coupon may then be carried by the user directly to a retail location and used to receive a discount on a given purchase.

It would be desirable to provide improved methods and systems for electronic delivery and use of coupons (namely, discount coupons, gift certificates, redeemable vouchers and the like) that could take advantage of the existing state-of-the-art of Internet and PDA technology.

BRIEF SUMMARY OF THE INVENTION

According to one embodiment of the present invention, an electronic or "virtual" coupon is obtained when a user selects a given link in a Web page being displayed on a client machine. Preferably, the link is an image link embedded on a Web site and/or in an advertising banner that is displayed on the Web page such that user click-through on the banner automatically generates the virtual coupon. The virtual coupon is then saved to a file on the client machine. Thereafter, the virtual coupon is downloaded to a PDA via a communication link when the PDA is synchronized to the desktop. When the virtual coupon is downloaded to the PDA, it is automatically saved in a coupon file. In addition, contact information associated with the coupon provider (e.g., address, web site URL, map and e-mail information) is automatically written to the PDA contact file. Moreover, the coupon's expiration date is stored in PDA's calendar, together with information for generating one or more redemption remainders that are periodically issued to the PDA user when the device is powered on. When the user desires to redeem the coupon, he or she may take the PDA to a terminal located at a retail establishment. By synchronizing the PDA to the terminal, the virtual coupon is redeemed in exchange for a discount on a given product or service. Alternatively, the coupon may be redeemed for an online purchase by connecting the PDA to a Web site, e.g., using a wireless connection.

According to another embodiment of the invention, a user of a PDA having a wireless Internet connection may navigate to a Web site and select a link (e.g., a link in an advertising banner) and receive the virtual coupon directly.

According to the invention, a central web site may be used to manage the distribution of the virtual coupons. In particular, an advertiser that desires to issue virtual discounts may register its coupons with the web site, perhaps for a given fee. Later, when users click through banner advertisements that include links to the web site, the users are seamlessly redirected to the site, which records the transactions and issues the virtual coupons. The site maintains a database of users who have downloaded virtual coupons, and such information is also available for collateral promotional activities relating to the service.

Alternatively, a given advertiser (e.g., a retail department store) may offer the virtual coupons from its own site. In this case, the user navigates to the advertiser's site and selects the virtual coupon, which is then downloaded to the PDA (either through the user's PC-PDA link) or to the PDA directly as previously described.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
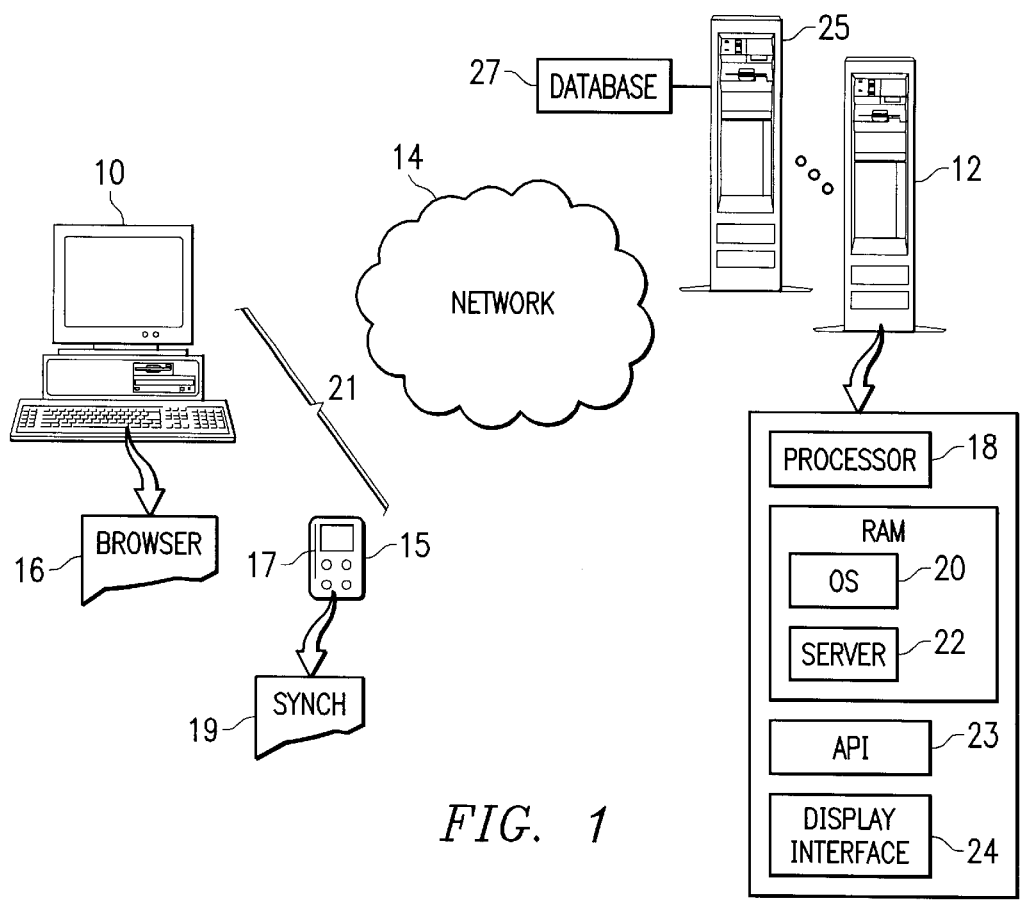
FIG. 1 is a representative Internet operating environment in which the present invention may be implemented.

A known Internet client-server system is implemented is illustrated in FIG. 1. A client machine 10 is connected to a Web server 12 via network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, which is a known software tool used to access the servers of the network. The web server supports files (collectively referred to as a web site) in the form of hypertext documents and objects. In the Internet paradigm, a network path to a server is identified by a so-called Uniform Resource Locator (URL).

A representative web server 12 is an IBM Netfinity server comprising a RISC-based processor 18, the AIX® operating system 20 and a web server program 22, such as Netscape Enterprise Server. The server 12 also includes a display 24 supporting a graphical user interface (GUI) for management and administration, and an Application Programming Interface (API) 23 that provides extensions to enable application developers to extend and/or customize the core functionality thereof through software programs including Common Gateway Interface (CGI) programs, plug-ins, servlets, active server pages, server side include (SSI) functions or the like.

A representative Web client is a personal computer that is x86-, PowerPC®- or RISC-based, that includes an operating system such as IBM® OS/2® or Microsoft Windows '95, and that includes a Web browser, such as Netscape Navigator 4.0 (or higher), having a Java Virtual Machine (JVM) and support for application plug-ins or helper applications.

Also illustrated in FIG. 1 is a representative handheld computing client device 15 such as a personal digital assistant or PDA. The device typically includes a handheld stylus 17 for inputting information to the device. A representative device is marketed by Palm Computing, Inc., a 3Com Company, under the Palm V™ Organizer trademark. PDA 15 also includes synchronization software 19 that interfaces with an associated routine supported in the desktop computer to facilitate synchronization of data between the desktop and the PDA over a communications link 21 (e.g., an infrared, serial or wireless connection). Representative PDA devices include a x86-, PowerPC®- or RISC-based processor, a realtime operating system such as WindRiver VXWorks™, QSSL QNXNeutrino™, PalmOS, or Microsoft Windows CE, a Web browser or other graphics viewer, device drivers, control software, and a modem. These devices also include non-volatile memory, as well as system memory (namely, RAM).

While PDA is illustrated as a handheld organizer, any type of portable computing device can be used. These include, without limitation, business organizers, PCMCIA-based organizers, smart watches, Internet appliances, and other such devices.

A client machine and the PDA implementing the inventive protocol described below includes appropriate software for requesting and/or responding to given messages, and for extracting the data of interest. Such software is executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

Figure 3:
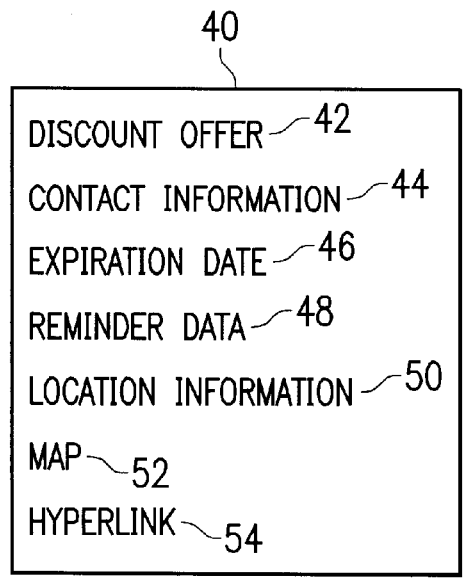
FIG. 3 is a representative data file comprising a virtual coupon.

As also illustrated in FIG. 1, one of the servers in the network may be a central or clearinghouse server 25 (which may be a group of such servers). This site includes a database 27 for supporting a set of virtual coupons available for download to client machines according to the invention. A given virtual coupon 40, as illustrated in FIG. 3, may comprise a data file of information including, without limitation, a discount offer 42, contact information 44 (e.g., e-mail address, customer service or other telephone numbers), an expiration date 46, reminder data 48 for generating redemption reminders, retail location information 50, a map 52, a hyperlink 54 to the provider's web site, and other such useful information. Providers of virtual coupons preferably store those coupons in the database. The operator of the server 25 may provide the virtual coupon distribution service for a fee. The virtual coupons are served with web pages in a conventional manner. In particular, given web sites contract with the server 25 to access the stored virtual coupons. When those web sites are later accessed by users with client machines, the virtual coupons are selectively served, e.g., as banner advertisements with embedded links to the web server 25.

Returning now back to FIG. 1, it is now assumed that a web page displaying a banner advertisement (or other clickable graphic or text) having an associated virtual coupon link is being rendered on a client machine. When the user of that machine selects the advertisement, the client's browser is redirected to the server 25, which then serves the virtual coupon back to the client. At this point, a pop-up window or other announcement (e.g., an e-mail) may be provided to the user at the client machine indicating that the virtual coupon offer has been delivered. The virtual coupon and, in particular, the data file, is then stored in the client machine. Preferably, the virtual coupon file is maintained in a non-volatile storage area of the client (e.g., the hard disk).

Figure 2:
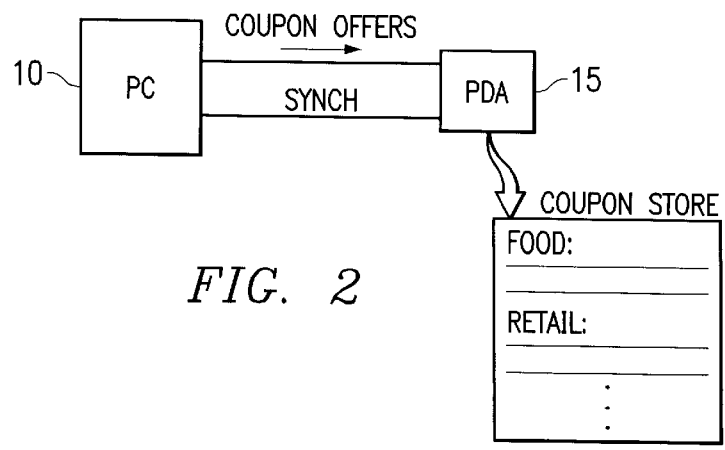
FIG. 2 illustrates the transfer of the virtual coupon from the user's desktop computer to his or her PDA.

Referring now to FIG. 2, when the user later synchronizes his or her PDA device to the client, the virtual coupon is automatically downloaded to the PDA. Preferably, the virtual coupon is stored in the memo or notepad section of the PDA (or, alternatively, in a specific PDA coupon organizer), the contact information is automatically supplied to the PDA contact file, and the expiration date information is automatically supplied to the PDA calendaring system. If the PDA has graphics capability (e.g., a browser or rendering engine), the map data may be stored for subsequent recall and display. In addition, the redemption reminder data is provided to the PDA calendar to facilitate display of periodic reminders to the user. Thus, for example, when the user powers on the PDA on a given day tagged for a reminder, a message (e.g., "you have 2 days left to redeem your American Airlines travel voucher) is posted to the PDA display. Preferably, expired coupons are automically deleted from storage, although the contact information is preferably maintained for future use.

As one of ordinary skill will readily appreciate, the present invention offers numerous advantages. With the inventive technique, the consumer is able to "clip" coupons on the web and organize them in a PDA or other portable computing device. In particular, given virtual coupons may be readily organized into different selectable groups (e.g., food, entertainment, travel, retail, etc.) for ease of retrieval and use. The user need no longer worry about locating and carrying the actual paper.

When incorporated within a web page or other application, such as a web calendar, users click through a licensed advertising banner and seamlessly transfer a virtual coupon to a PDA that is ready for redemption. Thus, for example, if a user is already registered with and a user of a web calendar, the user synchronizes his client PIM with his personal web calendar, and the user uses a PDA, the user may click through a virtual coupon banner and transfer the coupon to the PDA directly.

For the advertiser, the present invention provides another distribution mechanism for coupons. The virtual coupon affords advertisers the ability to target their advertisements and reduce costs. Advertisers pay standard web advertising banner fees, but only pay one fee when the coupon is downloaded. Advertisers may share revenues if there is a sale. The inventive distribution technique is a value-added advertising banner that is convenient, accessible, private, and readily integrated into existing web and PDA technologies. As described above, the virtual coupon is not a paper coupon (although it could be) but, rather, is a true digital coupon obtainable on the Internet (or via an intranet or other computer network) by either clicking a banner advertisement or, alternatively, navigating to a site that supports the virtual coupon functionality. As noted above, the banner advertisement offers the consumer a free coupon for the product the consumer wants, preferably by clicking the banner.

Figure 4:
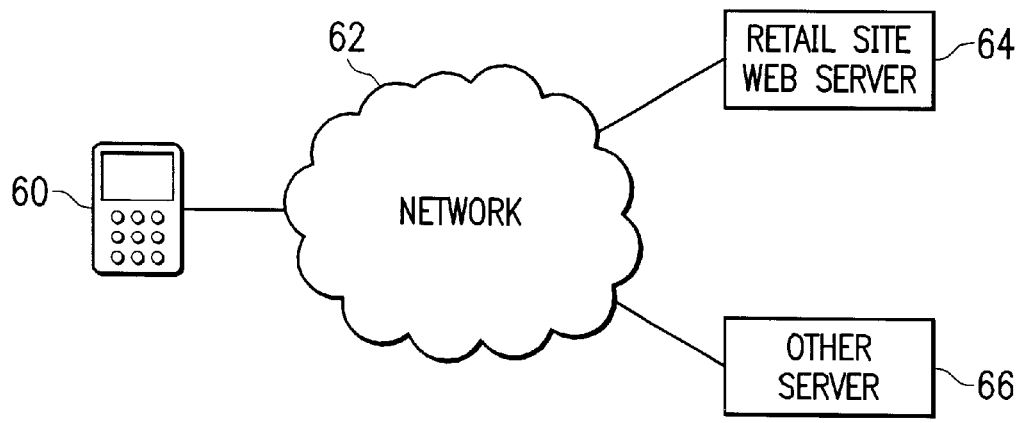
FIG. 4 is an alternative embodiment of the invention wherein a user of a PDA downloads a coupon directly from a server.

There are many variants of the above-described scheme. Thus, for example, the user may access the Internet directly with a PDA device, such as illustrated in FIG. 4. In this example, the PDA 60 (e.g., a Palm VII device) has a wireless Internet connection over network 62 to the server 64 from which coupons are available. As noted above, server 64 may serve coupons directly, or it may cause such coupons to be served to the PDA by redirecting a request to another server 66 that actually serves the coupons. In either case, the coupons are served directly to the PDA, which then stores them as previously described. In this manner, the user is not required to first download the virtual coupons to his or her PC and then, later, transfer those coupons to the PDA through the infrared or other link.

As used herein, a "coupon" should be broadly construed to cover any offer that can be redeemed for some product, service, credit or the like. Thus, a coupon includes a gift certificate, a redeemable voucher, a percentage discount, a merchandise credit, and the like.

Although not illustrated in detail, it should be appreciated that appropriate security techniques may be used to ensure integrity of the coupon delivery mechanism of the present invention. Thus, for example, the coupon may be downloaded (either to the PC or the PDA) as an unalterable digital image or with a verifying code (e.g., a digital watermark, a checksum, or the like). This would prevent alteration of the coupon's expiration date, for example. If desired, the coupon may be downloaded from the network to the PC or PDA over a secure link (e.g., a secure sockets layer) or using an appropriate encryption scheme (e.g., PGP). Another desirable fraud prevention technique is to associate a given identifier (e.g., a coupon serial number) with a given user (or user identifier, such as a cookie). Thus, for example, the given identifier may be associated with the given user when the user first downloads the coupon. When the user desires to redeem the virtual coupon, the coupon is first authenticated before it is honored. One technique for authenticating the coupon (or the user, as the case may be) is to have the redemption site send a message to a server that issued the coupon or that manages such validity checks.

Of course, virtual coupons may also be managed directly through a user's PC, instead of using the PDA. In this way, a user may navigate to a site (e.g., a Neiman-Marcus web site), select an item that generates a virtual coupon to the user's computer, and then later redeem that virtual coupon in a virtual manner (e.g., in an online manner).

Although the various methods described herein are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a "client" should be broadly construed to mean any computer or component thereof directly or indirectly connected or connectable in any known or later-developed manner to a computer network, such as the Internet. Of course, a "client" should be broadly construed to mean one who requests or gets the file, and "server" is the entity which downloads the file.

Having thus described my invention, what I claim as new and desire to secure by Letters Patent is set forth in the following claims:

What is claimed is:

1. A computer-implemented method of organizing electronic coupons, comprising:

displaying on a client a Web page having a clickable graphic;

in response to selection of the clickable graphic by a user at said client, receiving a digital file at the client, said digital file including a coupon offer;

transferring the digital file from the client to a portable computing device, wherein said portable computing device is operable to extract a plurality of said coupon offers from a plurality of said digital files and to organize said plurality of said coupon offers;

upon a request by a user, displaying images representative of said coupon offers on said portable computing device; and establishing an electronic communication link between said portable computing device and a merchant computer, whereby at least one of said coupon offers can be presented to said merchant computer for redemption.

2. The method as described in claim 1 wherein said electronic communication link is established at a terminal located at a retail establishment.

3. The method as described in claim 1 wherein the digital file transferred to the portable computing device also includes other data transferred to the portable computing device.

4. The method as described in claim 3 wherein the other data includes a map.

5. The method as described in claim 3 wherein the other data includes a hyperlink to a provider's web site.

6. The method as described in claim 3 wherein the other data includes reminder dates.

7. The method as described in claim 6 wherein the reminder dates are used to generate reminder messages on the portable computing device.

8. The method as described in claim 1 wherein the digital file is served from a server at which a plurality of digital files are maintained.

9. A computer-implemented method of organizing electronic coupons, comprising:

displaying on a portable digital assistant (PDA) information including a link;

in response to selection of the link by a user of said PDA, receiving a digital file at the PDA, the digital file including a coupon offer, contact information, and an expiration date, wherein said portable computing device is operable to extract a plurality of said coupon offers from a plurality of said digital files and to organize said plurality of said coupon offers, contact information, and expiration dates;

storing the coupon offer and saving the contact information in a contact database in the PDA;

upon a request by said user, displaying images representative of said coupon offers on said portable computing device; and establishing an electronic communication link between said portable computing device and a merchant computer, whereby at least one of said coupon offers can be presented to said merchant computer for redemption.

10. The method as described in claim 9 wherein the digital file includes an unalterable digital representation of a coupon.

11. The method as described in claim 9 wherein the digital file is served to the PDA over a secure link.

12. The method as described in claim 9 wherein the coupon offer is associated with a given user identifier to prevent use of the coupon offer by a third party.

13. The method as described in claim 12 wherein the given user identifier is a cookie.

14. A computer-implemented method of organizing electronic coupons, comprising:

building a database comprising a plurality of digital files, said digital files each comprising a coupon offer;

providing a hypertext object on a web server, said hypertext object comprising a hypertext link associated with one of said digital files of said database;

transmitting said hypertext object to a client upon a request from said client, whereby said client can display a web page comprising a clickable graphic associated with said hypertext link; and in response to selection of said clickable graphic by a user at said client, serving at least one of said digital files to said client, said at least one digital file including said coupon offer.

15. The method of claim 14 and further comprising providing other data in said digital files in addition to said coupon offer.

16. The method of claim 15 wherein said other data is contact information relating to the contact information for redemption of the coupon.

17. The method of claim 16 wherein said contact information comprises a hyperlink.

18. The method of claim 14 wherein said database comprising a plurality of digital files is stored on an ad server and wherein said hypertext object is stored on a web server, and wherein said ad server and said web server are different physical computers.

19. The method of claim 14 wherein said coupon offer further comprises category information whereby said coupon offer can be automatically organized at said client.

* * * * *